United States Patent
Honig et al.

(10) Patent No.: US 7,950,674 B2
(45) Date of Patent: May 31, 2011

(54) RIDE HEIGHT LEVELING CONTROL FOR DUAL AIR SPRING CONFIGURATION

(75) Inventors: Jonathan L. Honig, Bloomfield Hills, MI (US); David A. VanRaaphorst, Auburn Hills, MI (US)

(73) Assignee: ArvinMeritor Technology, LLC, Troy, MI (US)

( * ) Notice: Subject to any disclaimer, the term of this patent is extended or adjusted under 35 U.S.C. 154(b) by 126 days.

(21) Appl. No.: 12/421,064

(22) Filed: Apr. 9, 2009

(65) Prior Publication Data

US 2010/0259018 A1    Oct. 14, 2010

(51) Int. Cl.
*F16F 9/05*  (2006.01)
*F16F 9/43*  (2006.01)
*B60G 17/052* (2006.01)
*B60G 11/27* (2006.01)
*B60G 17/056* (2006.01)

(52) U.S. Cl. ............... 280/5.514; 280/6.157; 280/6.159; 280/124.157; 267/64.27; 267/64.28; 188/298; 701/37

(58) Field of Classification Search ............... 280/5.503, 280/5.514, 6.157, 6.159, 124.157, 5.515, 280/5.5; 267/64.16, 64.19, 64.21, 64.24, 267/64.23, 64.25, 64.27, 64.28, 122; 188/298; 701/37; *F16F 9/05, 9/43; B60G 17/052, 11/27, 17/056*

See application file for complete search history.

(56) References Cited

U.S. PATENT DOCUMENTS

| | | | |
|---|---|---|---|
| 7,156,382 B2 * | 1/2007 | Lloyd | 267/64.28 |
| 2006/0267297 A1 * | 11/2006 | Nordmeyer et al. | 280/5.515 |
| 2010/0230910 A1 * | 9/2010 | Kleckner et al. | 280/5.5 |
| 2010/0230911 A1 * | 9/2010 | Peterson | 280/5.503 |
| 2010/0230912 A1 * | 9/2010 | Lloyd | 280/5.503 |
| 2010/0230913 A1 * | 9/2010 | Peterson | 280/5.503 |

\* cited by examiner

*Primary Examiner* — Paul N Dickson
*Assistant Examiner* — Keith Frisby
(74) *Attorney, Agent, or Firm* — Carlson, Gaskey & Olds, PC

(57) ABSTRACT

An air suspension system is configured to adjust and maintain a desired vehicle ride height and spring rate. The air suspension system includes a plurality of air spring assemblies that each include a piston airbag and a primary airbag mounted around the piston airbag. A controller receives ride height input data and adjusts pressures within the primary and piston airbags until the desired ride height and spring rate is achieved. The controller accommodates for system hardware differences by varying flow rates into and out of the primary and piston airbags relative to each other.

19 Claims, 3 Drawing Sheets

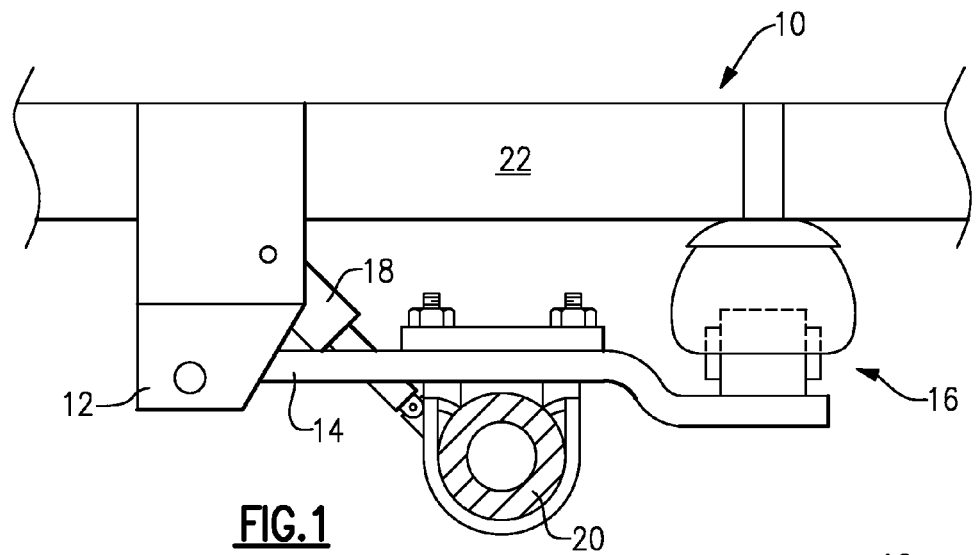
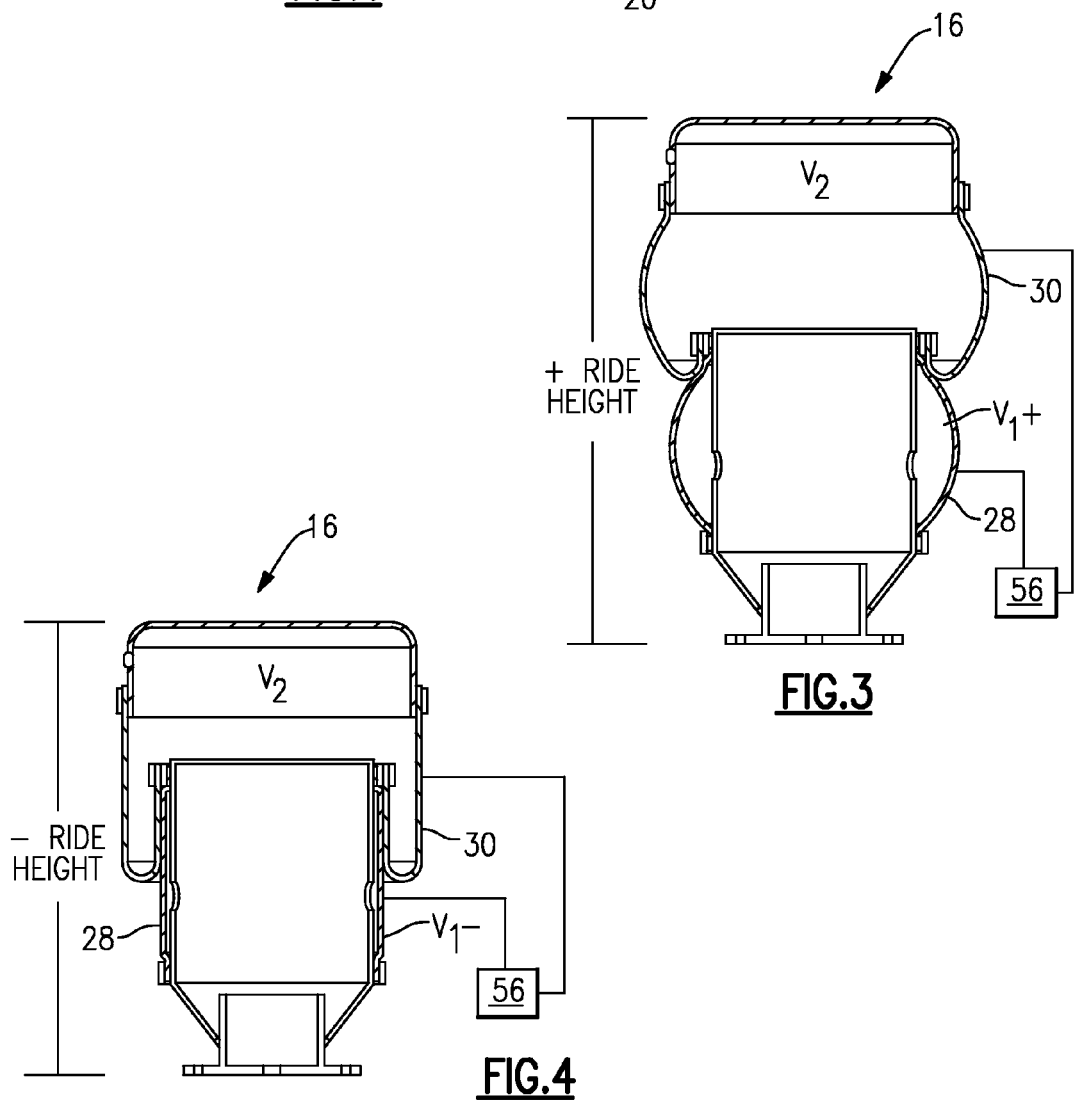

RIDE HEIGHT LEVELING CONTROL FOR DUAL AIR SPRING CONFIGURATION

TECHNICAL FIELD

This invention generally relates to an air suspension system that is configured to actively adjust and maintain a desired vehicle ride height and spring rate as needed.

BACKGROUND OF THE INVENTION

Air suspensions utilize air springs to provide desired output characteristics, such as ride comfort, maintaining vehicle height and vehicle performance for example. One known active air suspension uses an air spring assembly that includes a primary airbag mounted around a piston airbag such that the piston airbag provides a rolling surface for the primary airbag. A change in piston airbag volume changes an effective piston area of the primary airbag. A relatively small change in the effective piston area provides a change in a spring rate of the air spring assembly. The pressures in the piston airbag and the primary airbag are selectively controlled to provide infinite variation in spring rates. The smaller volume of the piston airbag relative to the larger volume of the primary airbag permits rapid pressure and volume changes to enable active suspension control.

Typically, there is one air spring located at each corner of the vehicle such that vehicle ride height can be adjusted by increasing or decreasing pressure within the air spring assembly. Vehicles equipped with suspension systems that have multiple airbags at each corner have difficulty adjusting vehicle ride height in a smooth and repeatable manner. A main function of the primary airbag is to bear the vehicle weight and control the vehicle height at each corner. The main function of the piston airbag is to change the spring rate or load at each corner. An effect of change of the volume or pressure of the piston airbag is a corresponding change in ride height. This often results in the vehicle changing direction one or more times during a single height or spring rate change request, resulting in a vehicle oscillation. Thus, there is a need to provide a ride height control for an active air suspension with a dual air spring configuration where changes in ride height are accomplished smoothly without multiple changes in direction.

SUMMARY OF THE INVENTION

An air suspension system is configured to adjust and maintain a desired vehicle ride height. The air suspension system includes a plurality of air spring assemblies that each include a piston airbag and a primary airbag mounted adjacent to the piston airbag. A controller receives input data, including ride heights and pressures, and adjusts pressures within the primary and piston airbags until the desired ride height and spring rate is achieved.

In one example, the controller accounts for system hardware differences by varying flow rates into and out of the primary and piston airbags relative to each other.

In one example, once the desired ride height is achieved, the controller inflates and deflates at least one of the piston airbag or primary airbag to maintain the desired ride height. Once the controller receives a subsequent (different) ride height change request, the controller then varies the flow rates to and from both the primary and piston airbags until the new ride height is achieved.

These and other features of the present invention can be best understood from the following specification and drawings, the following of which is a brief description.

BRIEF DESCRIPTION OF THE DRAWINGS

FIG. 1 is a general side view of one example of an active air suspension as installed on a vehicle.

FIG. 3 is a sectional view of the air spring in a first position.

FIG. 4 is a sectional view of the air spring in a second position.

DETAILED DESCRIPTION OF THE PREFERRED EMBODIMENT

Figure 2:
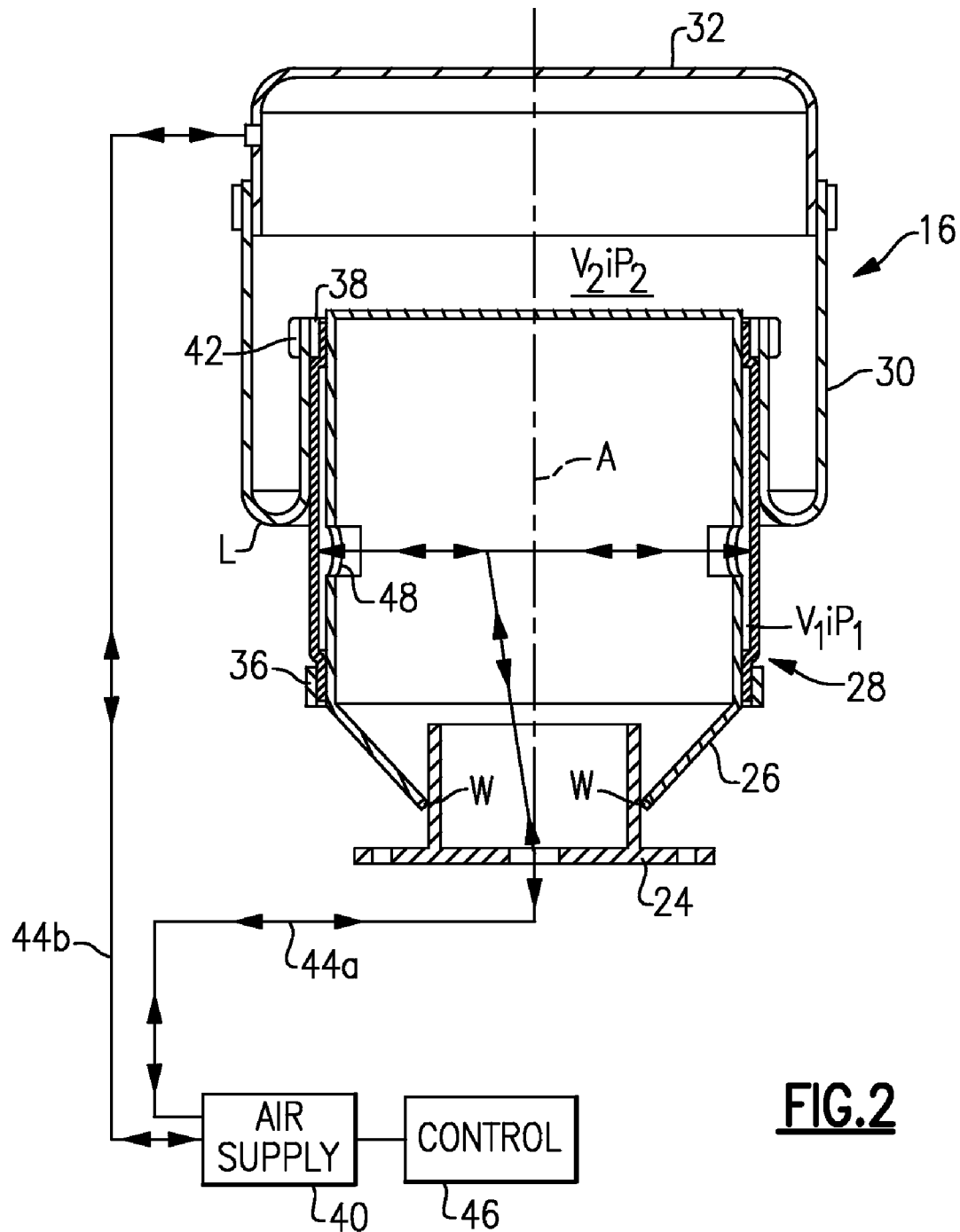
FIG. 2 is a sectional view of an air spring assembly as used in the active air suspension of FIG. 1.

FIG. 1 illustrates an air suspension system 10 for a vehicle. The air suspension system 10 generally includes a bracket 12, a longitudinal member 14, an air spring assembly 16, a damper 18, and an axle assembly 20. The air suspension system 10 is fixed to a frame or chassis of the vehicle (shown schematically at 22). The longitudinal member 14 could comprise a suspension arm, for example, and the axle assembly 20 could comprise any type of axle, such as a drive axle, non-drive axle, trailer axle, etc. The axle assembly 20 extends between laterally spaced wheels (not shown). It should be understood that the air suspension system 10 includes a longitudinal member 14, an air spring assembly 16, and a damper 18 at each lateral end of the axle assembly 20.

Referring to FIG. 2, the air spring assembly 16 is illustrated in cross-section. The air spring assembly 16 is defined along a central vertical axis A and includes a lower mount 24 (illustrated schematically), a piston support 26 attached to the lower mount 24, a piston airbag 28, and a primary airbag 30. An upper mount 32 is attached to the primary airbag 30. The upper 32 and lower 24 mounts provide attachment for the air spring assembly 16 between the longitudinal member 14 and chassis 22 (see FIG. 1).

The piston support 26 is a cylindrical member defined about the axis A. At the lower mount 24 the piston support 26 can be attached to many different structures such as a strut, shock, damper, or other similar mechanism, for example. In one example, the piston support 26 is attached to the lower mount 24 at welds W; however other attachment methods could also be used. The piston support 26 and the lower mount 24 are relatively rigid components.

The piston airbag 28 is a flexile, resilient member and is attached to the piston support 26 through a first band 36 and a second band 38. The first band 36 is secured at a lower end of the piston support 26 and the second band 38 is secured at an upper or opposite end of the piston support 26. While bands are shown, it should be understood that other attachment structures and/or methods could be used to secure the piston airbag 28 to the piston support 26. The piston airbag 28 defines a first volume V1 that is enclosed vertically between the bands 36, 38 and between an inner surface of the piston airbag 28 and an outer surface of the piston support 26.

The primary airbag 30 is mounted to the piston airbag 28 through a third band 42 which is spaced radially outwardly relative to the second band 38 with the primary airbag 30 being located between the second 38 and third 42 bands. In other words, the primary airbag 30 is sandwiched between the third band 42 and the second band 38. The primary airbag 30 defines a second volume V2. It should be understood that while two volumes V1, and V2 are disclosed in the illustrated embodiment, additional volumes could also be utilized within the spring assembly 16 as needed. Further, any of these volumes may be selectively segmented to provide further incremental volume changes.

An air supply system 40 (illustrated schematically in FIG. 2) communicates air independently into the volumes V1, V2 through a first and second supply conduits 44a, 44b respectively in response to a controller 46 (illustrated schematically). The controller 46 is a suspension controller that provides active suspension control methodology. Ports 48 through the piston support 26 supply air into the first volume V1.

The piston airbag 28 operates as a rolloff piston surface for the primary airbag 30. In other words, the primary airbag 30 provides a rolling lobe L over a piston assembly having a variable diameter provided by the variable volume of the piston airbag 28. As the air spring assembly 16 experiences road load inputs, the lobe L of the primary airbag 30 rolls along the outer surface of the piston airbag 28. By changing the volume V1 or pressure P1 within the piston airbag 28 the outer diameter of the piston airbag 28 changes. A change in the piston airbag 28 volume V1 thereby changes the effective piston area of the primary airbag 30. It is also understood that the primary airbag 30 will exert a pressure P2 against the piston airbag 28, tending to reduce the outer diameter of the piston airbag 28 until an equilibrium diameter is reached. Therefore a change in pressure P1 will change the radial spring rate of the piston airbag 28 and change the equilibrium diameter also affecting the primary airbag spring rate.

Referring to FIG. 3, increasing the air pressure within the volume V1 increases the diameter of the piston airbag 28 to obtain a greater spring rate and ride height. That is, the increase in diameter of the piston airbag 28 results in an extension of the airbag assembly 16 as volume V1 effectively provides a larger rolloff piston. The opposite results are obtained when the pressure within the piston airbag 28 is reduced as volume V1 respectively decreases (FIG. 4). This reduces the ride height and spring rate.

A relatively small change in volume V1 provides a change in the spring rate of the primary airbag 30 as the diameter of the rolloff surface is selectively modified. A change in the pressure within the volume V1 couples a change in spring rate with a change in ride height when the pressure within volume V2 is maintained. The compression and rebound rates may alternatively be decoupled by simultaneously changing the volume of both V1 and V2.

By selectively controlling the pressure within volumes V1 and V2, infinite variation in spring rates are provided without an auxiliary tank and associated actuators. The relatively smaller volume of volume V1 relative to volume V2 permits rapid pressure and volume changes which enables active suspension control.

Figure 5:
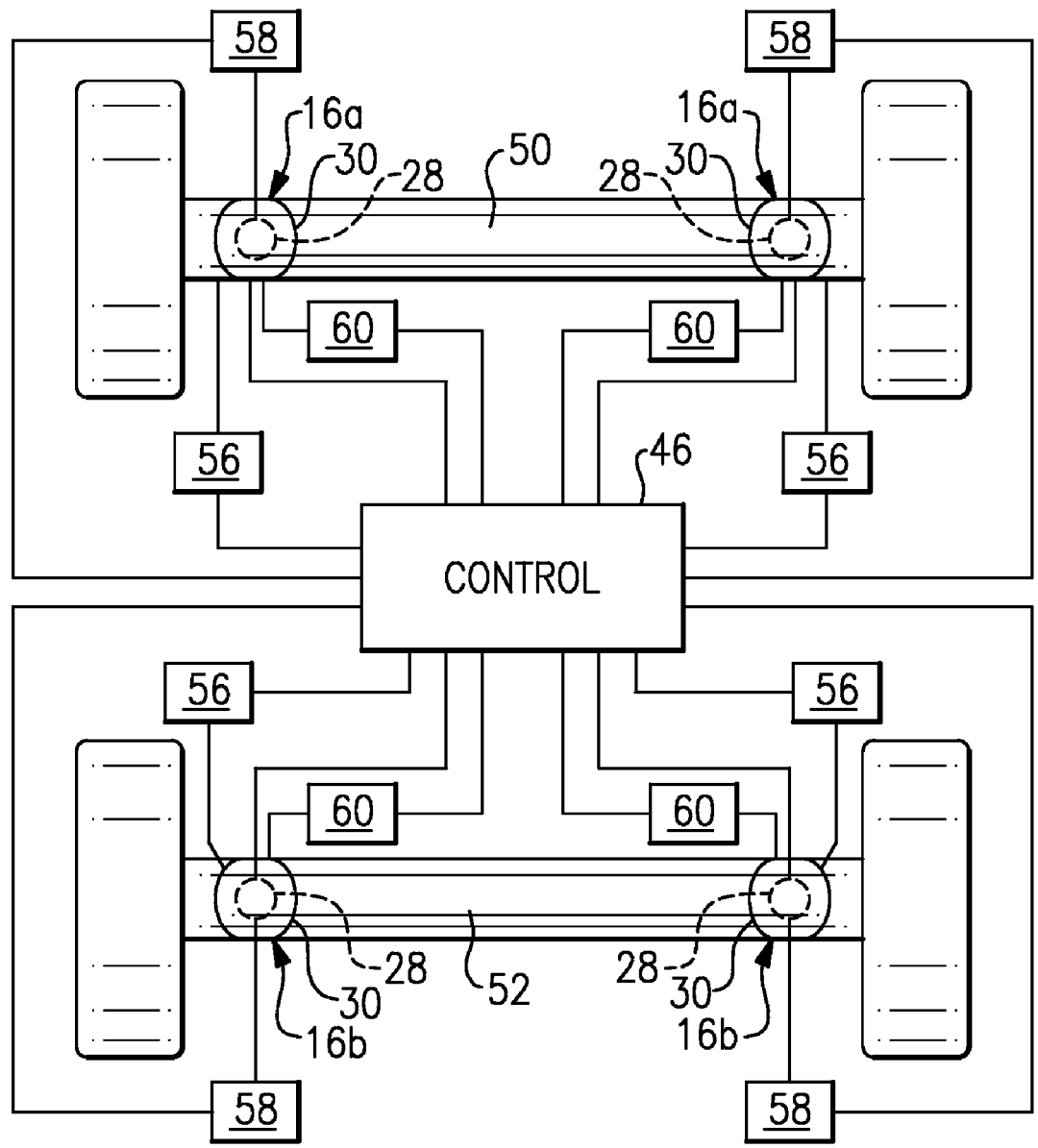
FIG. 5 is a schematic top view of a front set of air springs and a rear set of air springs controlled by a controller to adjust ride height.

The piston airbags 28 also provide for quick response times for making small changes in ride height. As shown in FIG. 5, there is one air spring assembly located at each corner of the vehicle. Due to the smaller volume of the piston airbag 28 compared to the primary airbag 30, ride height can be quickly changed solely by inflating or deflating the piston airbags 28. However, during operation of the active suspension it is difficult to maintain a desired ride height as the primary 30 and piston 28 airbags are actively controlled to accommodate vehicle loads and to vary spring rates/loads.

FIG. 5 shows one example where a first set of air spring assemblies 16a are associated with a front axle 50 and a second set of air spring assemblies 16b are associated with a rear axle 52. Each air spring assembly 16a, 16b is configured similar to the air spring assembly 16 shown in FIG. 2.

The controller 46 is configured to adjust the ride height and spring rate as needed in a quick and smooth manner without oscillations. The controller 46 is also configured to maintain a selected ride height and spring rate without introduction oscillating behavior into the system. The controller 46 defines and controls a rate of change for both the primary airbag 30 and the piston airbag 28 in order to provide smooth transitions during ride height changes.

First, an overall system architecture needs to be considered. The system architecture, which includes structures for flow restriction for example, takes into account differences between the different sub-systems, i.e. differences between various defined volumes within the primary 30 and piston 28 airbags. The goal of the controller 46 is to make the flow rates for filling and exhausting each volume as equal as possible through the existing system hardware.

However, vehicle requirements and system restrictions resulting from the hardware itself, work to prevent these flow rates from being equal. As a result, the controller 46 is configured to account for these hardware differences. The controller 46 accomplishes this by determining a resultant vehicle rate of height change from all systems involved. Differences in subsystem height rates can then be resolved using proper timing and synchronization, calculation of vehicle rate of change, and control rate of fill or exhaust through computer executable program.

In one example, a ride height sensor 56 (see FIGS. 3-4) is used to continuously monitor and measure ride height at each corner of the vehicle. As shown in FIG. 5, the ride height sensors 56 are associated and located at each air spring assembly 16a, 16b to directly monitor the ride height at each respective air spring assembly. The sensors 56 can monitor an overall ride height of the air spring assembly. These ride height measurements are then communicated to the controller 46.

When a ride height change request is communicated to the controller 46, the controller 46 determines the current ride height at each corner, i.e. at each air spring assembly 16a, 16b, and then inflates or deflates the air spring assemblies to achieve the selected ride height. The controller 46 varies the flow rates into and out of the primary 30 and/or piston 28 airbags to accomplish the ride height change without oscillation. In one example, the controller 46 simultaneously adjusts inflation/deflation of both the primary 30 and piston 28 airbags to achieve the desired ride height and spring rate.

Inflation and deflation of the primary 30 and piston 28 airbags is accomplished through system hardware that includes valve structures. In one example, inflation and deflation for each piston airbag 28 is controlled through a piston valve assembly 58, while inflation and deflation of each primary airbag 30 is controlled through a primary valve assembly 60. There is one primary valve assembly 60 for each primary airbag 30 and one piston valve assembly 58 for each piston airbag 28. Each of these valve assemblies can be comprised of a single valve to control both inflation and deflation and/or could comprise multiple valves that are used to control inflation and deflation.

The controller 46 is configured to recognize hardware differences between these valve structures and then determines appropriate inflation and/or deflation rates for each of the primary 30 and piston 28 airbags. For example, the primary 60 and piston 58 valve assemblies may include different orifice sizes relative to each other, which would accordingly result in a recognizable hardware difference between the valve assemblies. Thus, in order to provide a smooth ride height change, the controller 46 could fill each airbag volume at a different flow rate until the desired ride height is reached. In one example, the controller simultaneously adjusts both the primary 30 and piston 28 airbags with different flow rates to achieve the selected ride height.

By accommodating overall system and hardware differences, the suspension system is able to quickly and smoothly make ride height changes without introducing oscillating behavior. Also, by continuously monitoring the ride height at each corner, the controller 46 can maintain the selected ride height by making controlled flow rate adjustments within the primary 30 and piston 28 airbags. In one example, once a selected ride height is achieved, active changes to maintain the selected ride height are made solely through inflation/deflation of the piston airbags 28. Due to their smaller volume, the piston airbags 28 can be used to make small, incremental changes in a very responsive manner. Once the controller 46 receives a subsequent (different) ride height change request, the controller 46 then varies the flow rates to and from both the primary 30 and piston 28 airbags until the new ride height is achieved.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. An air suspension system comprising:
    a plurality of air spring assemblies, each air spring assembly including a piston airbag and a primary air bag mounted adjacent to the piston airbag with each air spring assembly being set at an initial ride height;
    a plurality of valve assemblies, with at least one valve assembly being associated with each of said primary and said piston airbags; and
    a controller that identifies flow restriction differences for said primary and said piston airbags and subsequently determines a resultant vehicle rate of height change based on identified flow restriction differences, and wherein said controller is configured to adjust and maintain a desired ride height and spring rate wherein said controller actively varies pressure within said primary and said piston airbags to achieve the desired ride height and spring rate by varying flow rates into and out of said primary and said piston airbags via associated valve assemblies based on the resultant vehicle rate of height change.

2. The air suspension system according to claim 1 wherein said controller actively varies spring force and spring rate of each air spring assembly independently of any other air spring assemblies during vehicle operation.

3. The air suspension system according to claim 2 wherein said controller continuously adjusts spring force and spring rate of each of the air spring assemblies by controlling air flow into and out of each piston airbag and each primary airbag.

4. The air suspension system according to claim 1 wherein said controller simultaneously adjusts flow rates into both said primary and said piston airbag within a common air spring assembly to adjust to said desired ride height and spring rate.

5. The air suspension system according to claim 1 including a plurality of ride height sensors continuously monitoring ride height and communicating ride height data to said controller as an input, and wherein said controller compares said desired ride height to the most recently received input and actively adjusts ride height to maintain said desired ride height.

6. The air suspension system according to claim 1 wherein, once said desired ride height is achieved, said controller adjusts ride height via controlling flow rates into and out of at least one of said primary airbag and piston airbag to maintain said desired ride height.

7. The air suspension system according to claim 1 wherein said primary airbags each define a respective primary airbag volume and said piston airbags each define a respective piston airbag volume, and wherein said controller actively controls the flow rates for filling and exhausting each volume such that flow rates into each of said primary airbag volumes is generally equal to each other and flow rates into each of said piston airbag volumes is generally equal to each other to provide a smooth ride height change.

8. The air suspension system according to claim 7 wherein said controller identifies any differences between the primary airbag volumes and between the piston airbag volumes and adjusts flow rates accordingly to maintain a smooth ride height change.

9. The air suspension system according to claim 1 wherein, once said desired ride height is achieved, active changes to maintain said desired ride height are made solely by said controller generating control signals to inflate or deflate said piston airbags.

10. The air suspension system according to claim 9 wherein, once a subsequent ride height change is requested, said controller varies flow rates from both said piston and primary airbags until said subsequent height change is achieved.

11. A method of adjusting ride height in an air suspension system comprising the steps of:
    (a) providing a plurality of air spring assemblies, each air spring assembly including a piston airbag and a primary air bag mounted adjacent to the piston airbag;
    (b) receiving a ride height change request defining a desired ride height;
    (c) determining current ride height; and
    (d) identifying flow restriction differences for the primary and piston airbags, subsequently determining a resultant vehicle rate of height change based on identified flow restriction differences, and actively controlling flow rates into and out of the primary and piston airbags based on the resultant vehicle rate of height change until the desired ride height is achieved.

12. The method according to claim 11 wherein step (d) includes simultaneously adjusting pressure in the primary and the piston airbags within a common air spring assembly.

13. The method according to claim 12 wherein step (d) includes inflating or deflating the piston airbag at a first flow rate and inflating or deflating the primary airbag at a second flow rate different than the first flow rate.

14. The method according to claim 11 including identifying hardware differences between various suspension components and modifying the flow rates to accommodate these hardware differences.

15. The method according to claim 11 including adjusting flow rates into and out of at least one the primary airbag and piston airbags once the desired ride height is achieved to maintain the desired ride height.

16. The method according to claim 11 wherein step (d) includes identifying hardware differences between piston and primary valve assemblies and adjusting the flow rates such that airbag volumes are filled at a consistent rate such that a smooth ride height change is achieved.

17. The method according to claim 11 wherein step (d) includes identifying differences between primary airbag volumes, identifying differences between piston airbag volumes, and adjusting flow rates accordingly such that airbag volumes are filled at a consistent rate to maintain a smooth ride height change.

18. The method according to claim 11 including maintaining the desired ride height by solely controlling inflation or deflation rates of the piston airbags once the desired ride height is achieved.

19. The method according to claim 18 including receiving a new ride height change request subsequent to step (d) and varying flow rates for both the piston and primary airbags until the new ride height change is achieved.

* * * * *